United States Patent
Hsu et al.

(10) Patent No.: US 11,582,812 B2
(45) Date of Patent: Feb. 14, 2023

(54) CONTROL LINK SWITCH METHOD EMPLOYED BY WIRELESS FIDELITY MULTI-LINK DEVICE

(71) Applicant: MEDIATEK INC., Hsin-Chu (TW)

(72) Inventors: Chien-Fang Hsu, Hsinchu (TW); James Chih-Shi Yee, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 66 days.

(21) Appl. No.: 16/997,901

(22) Filed: Aug. 19, 2020

(65) Prior Publication Data

US 2021/0068171 A1 Mar. 4, 2021

Related U.S. Application Data

(60) Provisional application No. 62/891,991, filed on Aug. 27, 2019.

(51) Int. Cl.
*H04W 76/10* (2018.01)
*H04W 84/12* (2009.01)
*H04W 92/10* (2009.01)

(52) U.S. Cl.
CPC ............ *H04W 76/10* (2018.02); *H04W 84/12* (2013.01); *H04W 92/10* (2013.01)

(58) Field of Classification Search
CPC ..... H04W 84/12; H04W 84/18; H04W 36/06; H04W 88/06; H04W 88/04; H04W 72/0453; H04W 76/15; H04W 16/28; H04W 28/0231; H04W 28/0252; H04W 28/085; H04W 72/04; H04W 88/08; H04W 92/20; H04W 40/248; H04W 72/02; H04W 76/00; H04W 76/22; H04W 76/30; H04W 88/12; H04W 76/10; H04W 92/10; H04W 74/002; H04W 36/0011; H04W 36/08; H04W 36/18; H04W 76/20
See application file for complete search history.

(56) References Cited

U.S. PATENT DOCUMENTS

| | | | | |
|---|---|---|---|---|
| 2004/0264394 | A1* | 12/2004 | Ginzburg | ............... H04L 29/06 370/310 |
| 2013/0266136 | A1* | 10/2013 | Chu | .................. H04W 36/0033 380/34 |
| 2014/0018120 | A1* | 1/2014 | Anbe | ........................ H04L 1/20 455/509 |
| 2018/0279287 | A1* | 9/2018 | John Wilson | .......... H04B 7/088 |
| 2020/0221545 | A1* | 7/2020 | Stacey | .............. H04W 72/0453 |
| 2021/0168868 | A1* | 6/2021 | Jang | .................. H04W 74/0816 |
| 2021/0385006 | A1* | 12/2021 | Ryu | ...................... H04W 72/04 |

OTHER PUBLICATIONS

U.S. Appl. No. 62/835,346 (Priority application of Stacey et al. (US 2020/0221545 A1), filed Apr. 17, 2019 (Year: 2019).*
"Multi-Link Architecture and Requirement Discussion" (IEEE 802.11-2019/1095) by Fang et al., dated Jul. 14, 2019 (Year: 2019).*

\* cited by examiner

*Primary Examiner* — Daniel Lai
(74) *Attorney, Agent, or Firm* — Winston Hsu (57) ABSTRACT

A control link switch method is employed by a wireless fidelity (WI-FI) multi-link device (MLD). The control link switch method includes: sending a request frame to another WI-FI MLD for requesting a switch process of switching a current control link to a new control link, and receiving a response frame from another WI-FI MLD. After the response frame is received, the new control link is selectively enabled at the WI-FI MLD.

18 Claims, 8 Drawing Sheets

CONTROL LINK SWITCH METHOD EMPLOYED BY WIRELESS FIDELITY MULTI-LINK DEVICE

CROSS REFERENCE TO RELATED APPLICATIONS

This application claims the benefit of U.S. provisional application No. 62/891,991, filed on Aug. 27, 2019 and incorporated herein by reference.

BACKGROUND

The present invention relates to wireless communications, and more particularly, to a control link switch method employed by a wireless fidelity (WI-FI) multi-link device (MLD).

In a WI-FI multi-link operation, there exists several links between two MLDs, including one access point (AP) and one non-AP station (STA), that occupy different radio-frequency (RF) bands. These links can operate independently to increase the overall throughput and/or to improve the connection stability. In some applications, these links may include one or more dedicated links used for particular services. However, the dedicated link(s) may be unstable due to interference or may be unavailable due to non-AP STA's resource allocation change. Thus, there is a need for an innovative link switch mechanism in a WI-FI multi-link operation.

SUMMARY

One of the objectives of the claimed invention is to provide a control link switch method employed by a wireless fidelity (WI-FI) multi-link device (MLD).

According to a first aspect of the present invention, an exemplary control link switch method employed by a wireless fidelity (WI-FI) multi-link device (MLD) is disclosed. The exemplary control link switch method includes: sending a request frame to another WI-FI MLD for requesting a switch process of switching a current control link to a new control link; and receiving a response frame from said another WI-FI MLD, wherein after the response frame is received, the new control link is selectively enabled at the WI-FI MLD.

According to a second aspect of the present invention, an exemplary control link switch method employed by a wireless fidelity (WI-FI) multi-link device (MLD) is disclosed. The exemplary control link switch method includes: sending a request frame to another WI-FI MLD for requesting a switch process of switching a current control link to one new control link; receiving a counter frame from said another WI-FI MLD, wherein the counter frame suggests that the current control link be switched to another new control link by the switch process, where said another new control link is different from said one new control link; and sending a response frame to said another WI-FI MLD, wherein after the response frame is sent, said another new control link is selectively enabled at the WI-FI MLD.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
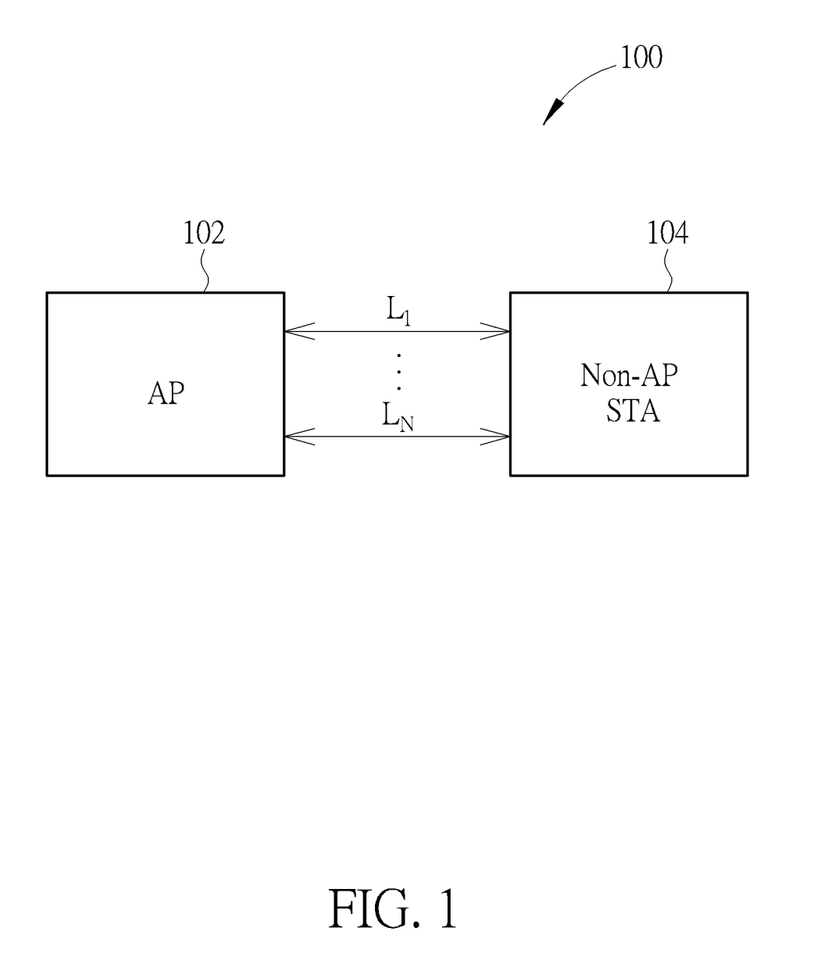
FIG. 1 is a diagram illustrating a wireless fidelity system according to an embodiment of the present invention.

FIG. 1 is a diagram illustrating a wireless fidelity (WI-FI) system according to an embodiment of the present invention. For brevity and simplicity, it is assumed that the WI-FI system 100 includes one access point (AP) 102 and one non-AP station (STA) 104. In this embodiment, AP 102 and STA 104 are both wireless fidelity (WI-FI) multi-link devices (MLDs). For example, AP 102 may own M links at different channels, and may communicate with non-AP STA 104 via N links $L_1$-$L_N$, where M and N are positive integers, N is not smaller than 2, and M is not smaller than N. In some embodiments of the present invention, non-AP STA 104 may be a dual-radio STA (N=2), and AP 102 may be a tri-band AP (M=3). For example, links owned by AP 102 may include a channel in upper 5 GHz (denoted by "U5" hereinafter), a channel in lower 5 GHz (denoted by "L5" hereinafter), and a channel in 2.4 GHz (denoted by "2.4" hereinafter). However, this is for illustrative purposes only, and is not meant to be a limitation of the present invention. Any WI-FI system using the proposed control link switch mechanism falls within the scope of the present invention. In accordance with the multi-link operation, these links $L_1$-$L_N$ between AP 102 and non-AP STA 104 may be categorized into control link(s) and non-control link(s), where the number of control links is not limited to one. In addition, the control link may have different naming but provide similar/same service in the multi-link operation. For example, the terms "control link", "primary link" and "anchor link" may be interchangeable, and a non-AP MLD may monitor and perform basic operations (such as traffic indication, BSS parameter updates, etc.) on one or more control/primary/anchor link(s).

In this embodiment, a dedicated link that serves as a control link may be designed to handle link control processes between AP 102 and non-AP STA 104, such as non-control link enable and disable; operation parameter negotiation (e.g., target wake time negotiation) and update for all links; broadcast and group addressed frame transmission/receive; power mode update and power state indication exchange for all links; security information exchange for all links; and/or general traffic.

The proposed control link switch process may be invoked under certain scenarios. For example, the proposed control link switch process may be invoked for achieving WI-FI roaming in EasyMesh. For another example, the proposed control link switch process may be invoked for achieving channel switch in the same basic service set (BSS). For yet another example, the proposed control link switch process may be invoked under a condition that the non-AP STA 104 needs to disable a link serving as a control link due to power saving, RF radio resource allocation, and/or local interference.

Figure 2:
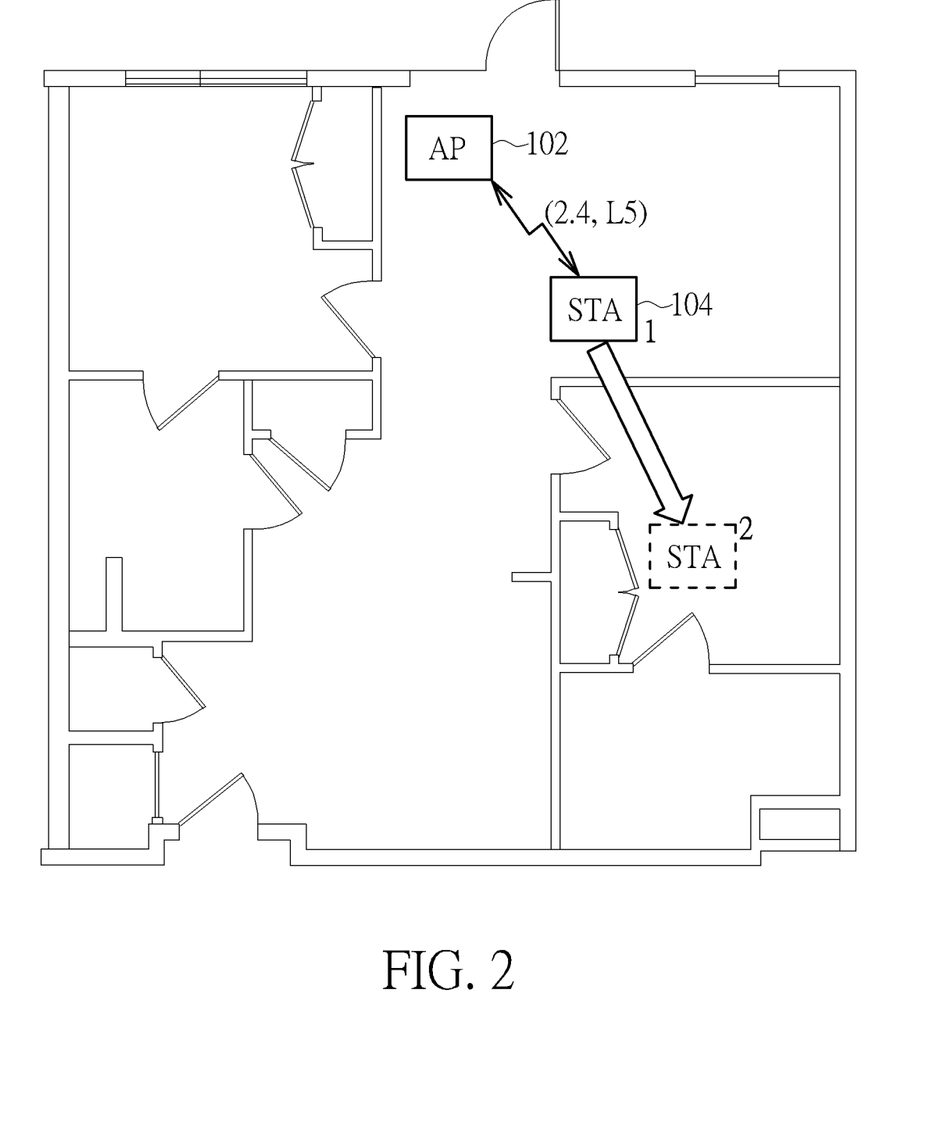
FIG. 2 is a diagram illustrating a first control link switch scenario according to an embodiment of the present invention.

FIG. 2 is a diagram illustrating a first control link switch scenario according to an embodiment of the present invention. In this example, AP 102 owns 3 links (2.4, L5, U5). The 2-link non-AP STA 104 is associated with the AP 102 with links (2.4, L5) at position 1, where the link L5 serves as the control link, and the link 2.4 serves as a non-control link. After the non-AP STA 104 moves to position 2, the L5 signal is attenuated by the wall between AP 102 and non-AP STA 104 and is too weak. Hence, the proposed control link switch process can be invoked to switch a current control link (e.g., L5) to a new control link (e.g., 2.4).

Figure 3:
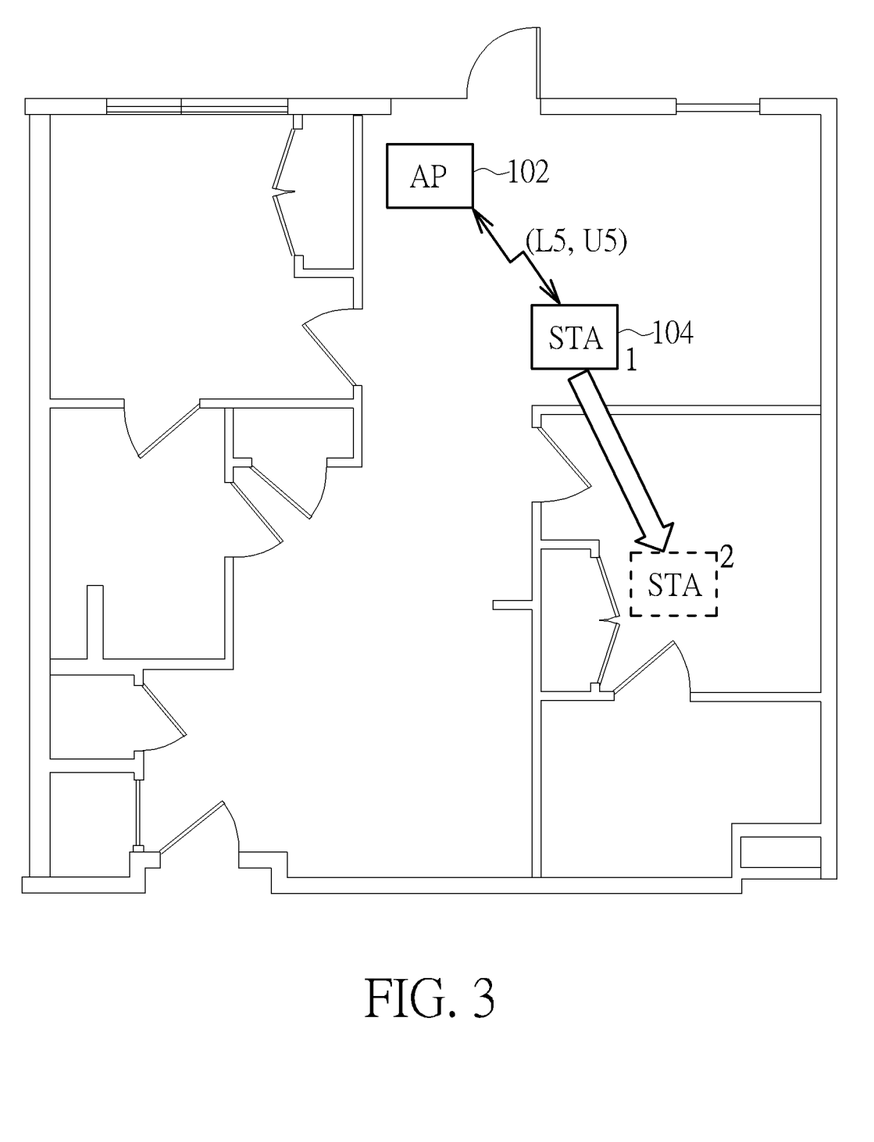
FIG. 3 is a diagram illustrating a second control link switch scenario according to an embodiment of the present invention.

FIG. 3 is a diagram illustrating a second control link switch scenario according to an embodiment of the present invention. In this example, the AP 102 owns 3 links (2.4, L5, U5). The 2-link non-AP STA 104 is associated with the AP 102 with links (L5, U5) at position 1, where the link L5 serves as the control link, and the link U5 serves as a non-control link. After the non-AP STA 104 moves to position 2, both of the L5 signal and the U5 signal are attenuated by the wall between AP 102 and non-AP STA 104 and are too weak. Hence, the non-AP STA 104 needs to disable a 5G link and enable a 2.4G link. The proposed control link switch process can be invoked to enable the currently disabled link 2.4 and switch a current control link (e.g., L5) to a new control link (e.g., 2.4).

Figure 4:
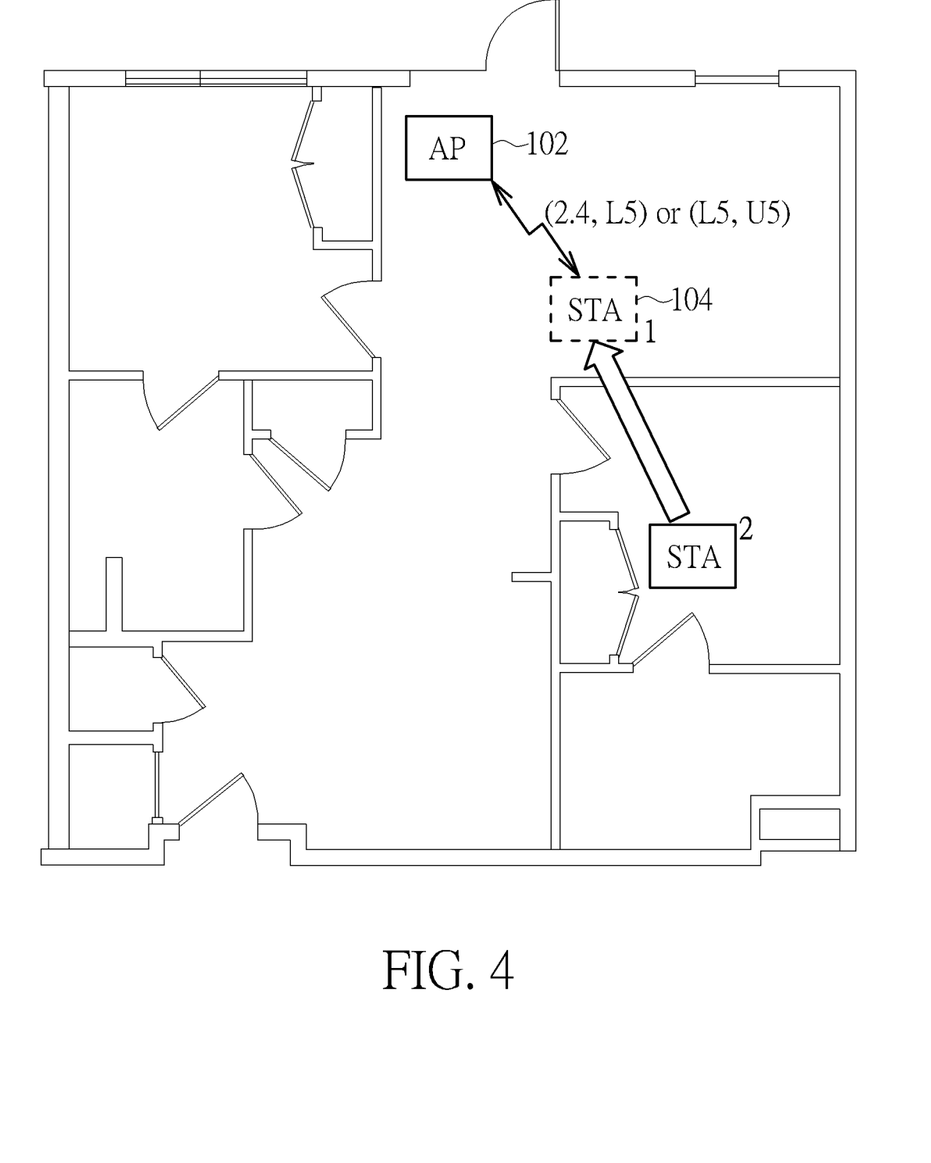
FIG. 4 is a diagram illustrating a third control link switch scenario according to an embodiment of the present invention.

FIG. 4 is a diagram illustrating a third control link switch scenario according to an embodiment of the present invention. In this example, the AP 102 owns 3 links (2.4, L5, U5). The 2-link non-AP STA 104 moves from position 2 to position 1. After the 2-link non-AP STA 104 moves to position 2, it may re-configure its control link to a 5G channel (e.g., L5). The proposed control link switch process can be invoked for switching a current control link (e.g., 2.4) to a new control link (e.g., L5).

Figure 5:
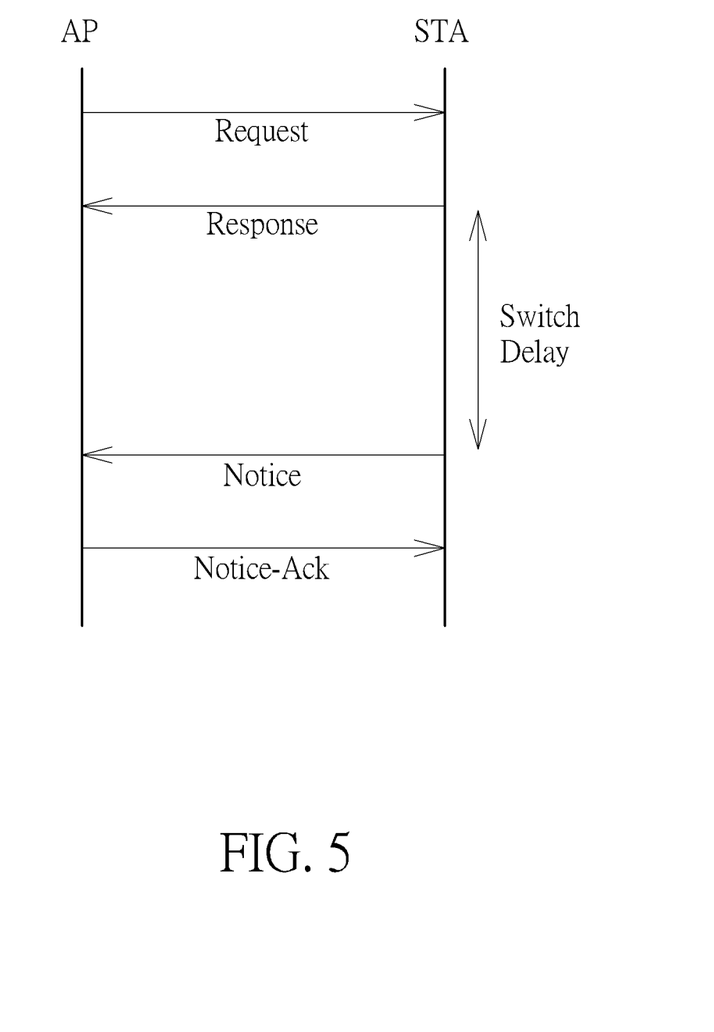
FIG. 5 is a sequence diagram of a first control link switch operation according to an embodiment of the present invention.

For better understanding of technical features of the present invention, several control link switch operations are given as below. FIG. 5 is a sequence diagram of a first control link switch operation according to an embodiment of the present invention. In this example, a control link switch process is initiated by a request frame sent from AP 102 to non-AP STA 104, where AP 102 and non-AP STA 104 are both WI-FI MLDs. The request frame is used for requesting a switch process of switching a current control link to a new control link. The request frame may include information elements (or fields) that carry necessary information of the control link switch process. For example, the request frame may include information elements indicating a frame type "Request", a request serial identifier (ID), a current control link channel ID, and/or parameters including a target control link channel ID, an optional required time to finish the switch process, a current control link role after switch, etc.

For example, the new control link indicated in the request frame may be a non-control link that is currently enabled between AP 102 and non-AP STA 104. For another example, the new control link indicated in the request frame may be a non-control link that is currently disabled between AP 102 and non-AP STA 104, but is capable of being enabled after the switch process. For yet another example, the new control link indicated in the request frame may be a null link.

After receiving the request frame, the non-AP STA 104 sends a response frame to the AP 102. The response frame may include information elements (or fields) that carry necessary information of the control link switch process. For example, the response frame may include information elements indicating a frame type "Response" and a frame status "Accept" or "Reject". The non-AP STA 104 may reject the request of control link switch and send the response frame carrying the rejection. Hence, the current control link remains unchanged. In this example shown in FIG. 5, the non-AP STA 104 accepts the request of control link switch and sends the response frame carrying the acceptance. Hence, the non-AP STA 104 will switch the control link according to indication of the new control link that is carried by the request frame. If the new control link is currently disabled, the request frame and the response frame need to carry link enable negotiation parameters to enable the link.

In one exemplary design, at least one of the request frame and the response frame may be transmitted through a current control link. In another exemplary design, at least one of the request frame and the response frame may be transmitted through a non-control link. To put it simply, the request/response frame exchange may be achieved by using current control link(s), non-control link(s), or a combination thereof. Preferably, the request/response frame exchange may occur through the same link.

The non-AP STA 104 starts the switch process after sending the response frame carrying that the non-AP STA 104 accepts the request of control link switch. In this example, the non-AP STA 104 sends a notice frame to AP 102 through the new control link after an optional switch delay for link setup. After receiving the notice frame, the AP 102 sends a notice acknowledgement (Notice-Ack) frame to the non-AP STA 104 through the new control link. In accordance with the proposed control link switch operation, the new control link becomes effective, and the old control link acts as one non-control link, one null link, or another control link, depending upon indication of the request frame.

In a case where the parameter "current control link role to be after switch" included in the request frame is set by "remain as another control link", the current control link is transferred to another control link after the switch process. Hence, the switch process may be treated as a control link addition process for adding a new control link between AP 102 and non-AP STA 104, resulting in multiple control links co-exiting between AP 102 and non-AP STA 104.

In another case where the parameter "target control link channel ID" included in the request frame is set by "Null" and the parameter "current control link role to be after switch" included in the request frame is set by "transfer to non-control link", the current control link is transferred to a null link after the switch process. Hence, the switch process may be treated as a control link removal process for deleting an existing control link between AP 102 and non-AP STA 104. If there exists only one control link between AP 102 and non-AP STA 104, the control link removal process should be forbidden.

Figure 6:
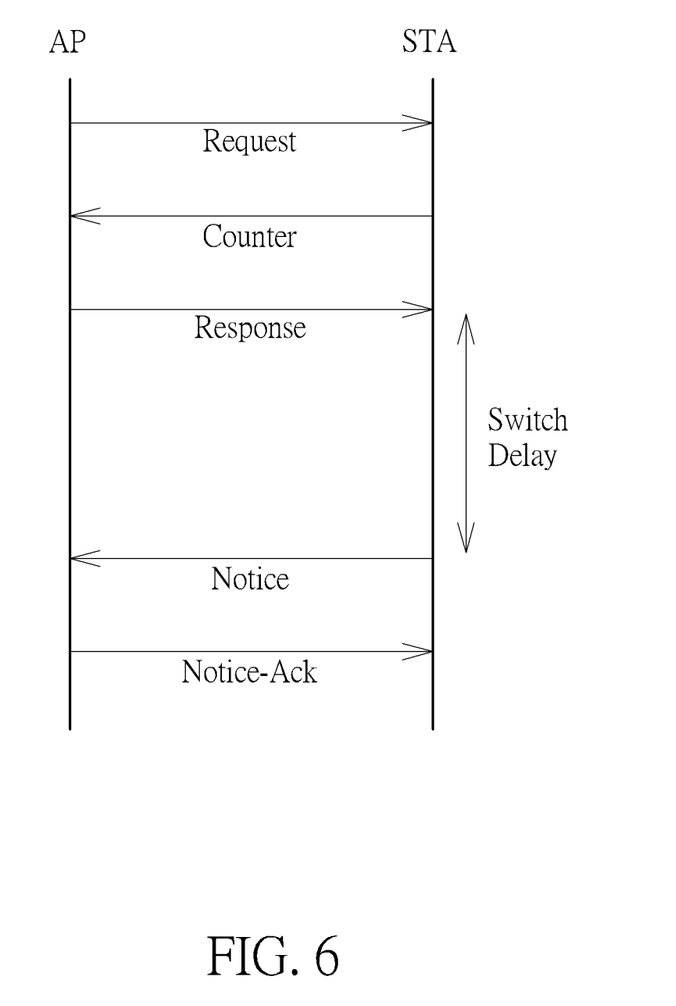
FIG. 6 is a sequence diagram of a second control link switch operation according to an embodiment of the present invention.

FIG. 6 is a sequence diagram of a second control link switch operation according to an embodiment of the present invention. In this example, a control link switch process is initiated by a request frame sent from AP 102 to non-AP STA 104, where AP 102 and non-AP STA 104 are both WI-FI MLDs. The request frame is used for requesting a switch process of switching a current control link to one new control link. The request frame may include information elements (or fields) that carry necessary information of the control link switch process. For example, the request frame may include information elements indicating a frame type "Request", a request serial ID, a current control link channel ID, and/or parameters including a target control link channel ID, an optional required time to finish the switch process, a current control link role after switch, etc.

For example, the new control link indicated in the request frame may be a non-control link that is currently enabled between AP 102 and non-AP STA 104. For another example, the new control link indicated in the request frame may be a non-control link that is currently disabled between AP 102 and non-AP STA 104, but is capable of being enabled after the switch process. For yet another example, the new control link indicated in the request frame may be a null link.

After receiving the request frame, the non-AP STA 104 sends a counter frame to the AP 102. The counter frame contains parameter suggestion on the STA side. Specifically, the counter frame suggests that the current control link be switched to another new control link (which is different from the new control link indicated in the request frame) by the switch process. For example, the new control link indicated in the counter frame may be a non-control link that is currently enabled between AP 102 and non-AP STA 104. For another example, the new control link indicated in the counter frame may be a non-control link that is currently disabled between AP 102 and non-AP STA 104, but is capable of being enabled after the switch process. For yet another example, the new control link indicated in the counter frame may be a null link. The counter frame may include information elements (or fields) that carry necessary information of the control link switch process. For example, the counter frame may include information elements indicating a frame type "Counter" and a parameter "target control link channel ID".

After receiving the counter frame, the AP 102 sends a response frame to the non-AP STA 104. The response frame may include information elements (or fields) that carry necessary information of the control link switch process. For example, the response frame may include information elements indicating a frame type "Response" and a frame status "Accept" or "Reject". The AP 102 may reject the STA-side suggestion of control link switch and send the response frame carrying the rejection. Hence, the current control link remains unchanged. In this example shown in FIG. 6, the AP 102 accepts the STA-side suggestion of control link switch, and sends the response frame carrying the acceptance and containing updated parameters adopted from STA's suggestion. Hence, the non-AP STA 104 will switch the control link. If the new control link is currently disabled, the request frame, the counter frame, and the response frame need to carry link enable negotiation parameters to enable the link.

In one exemplary design, at least one of the request frame, the counter frame and the response frame may be transmitted through a current control link. In another exemplary design, at least one of the request frame, the counter frame and the response frame may be transmitted through a non-control link. To put it simply, the request/counter/response frame exchange may be achieved by using current control link(s), non-control link(s), or a combination thereof. Preferably, the request/counter/response frame exchange may occur through the same link.

The non-AP STA 104 starts the switch process after receiving the response frame carrying that the AP 102 accepts the STA-side suggestion of control link switch. In this example, the non-AP STA 104 sends a notice frame to AP 102 through the new control link after an optional switch delay for link setup. After receiving the notice frame, the AP 102 sends a notice acknowledgement (Notice-Ack) frame to the non-AP STA 104 through the new control link. In accordance with the proposed control link switch operation, the new control link becomes effective, and the old control link acts as one non-control link, one null link, or another control link, depending upon indication of the request frame.

In a case where the parameter "current control link role to be after switch" included in the request frame is set by "remain as another control link", the current control link is transferred to another control link after the switch process. Hence, the switch process may be treated as a control link addition process for adding a new control link between AP 102 and non-AP STA 104, resulting in multiple control links co-existing between AP 102 and non-AP STA 104.

In another case where the parameter "target control link channel ID" included in the counter frame is set by "Null" and the parameter "current control link role to be after switch" included in the request frame is set by "transfer to non-control link", the current control link is transferred to a null link after the switch process. Hence, the switch process may be treated as a control link removal process for deleting an existing control link between AP 102 and non-AP STA 104. If there exists only one control link between AP 102 and non-AP STA 104, the control link removal process should be forbidden.

Figure 7:
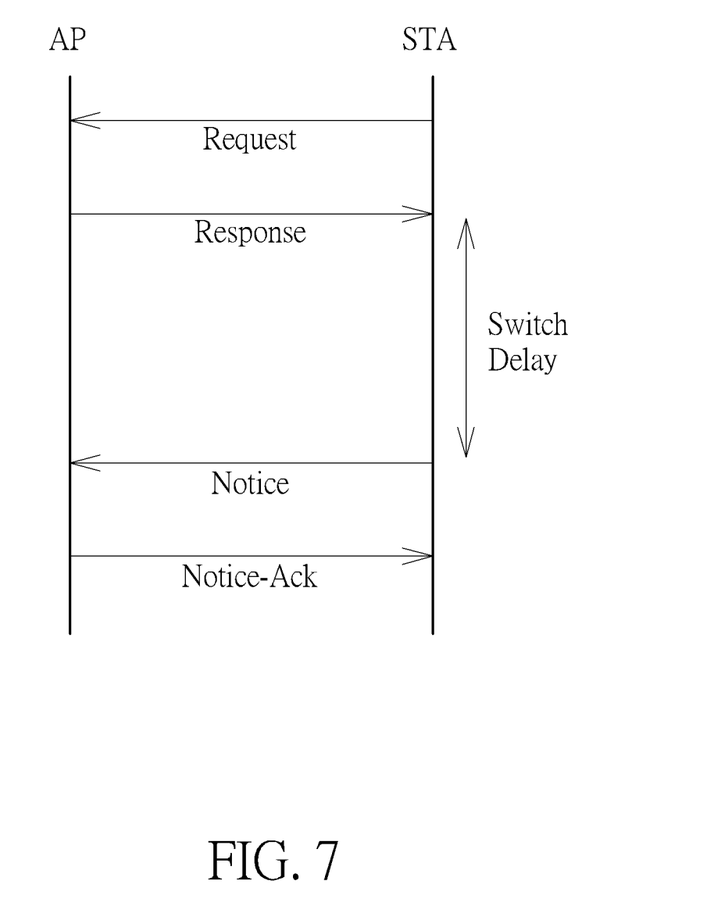
FIG. 7 is a sequence diagram of a third control link switch operation according to an embodiment of the present invention.

FIG. 7 is a sequence diagram of a third control link switch operation according to an embodiment of the present invention. In this example, a control link switch process is initiated by a request frame sent from non-AP STA 104 to AP 102, where AP 102 and non-AP STA 104 are both WI-FI MLDs. The request frame is used for requesting a switch process of switching a current control link to a new control link. The request frame may include information elements (or fields) that carry necessary information of the control link switch process. For example, the request frame may include information elements indicating a frame type "Request", a request serial ID, a current control link channel ID, and/or parameters including a target control link channel ID, an optional required time to finish the switch process, a current control link role after the switch process, etc.

For example, the new control link indicated in the request frame may be a non-control link that is currently enabled between AP 102 and non-AP STA 104. For another example, the new control link indicated in the request frame may be a non-control link that is currently disabled between AP 102 and non-AP STA 104, but is capable of being enabled after the switch process. For yet another example, the new control link indicated in the request frame may be a null link.

After receiving the request frame, the AP 102 sends a response frame to the non-AP STA 104. The response frame may include information elements (or fields) that carry necessary information of the control link switch process. For example, the response frame may include information elements indicating a frame type "Response" and a frame status "Accept" or "Reject". The AP 102 may reject the request of control link switch and send the response frame carrying the rejection. Hence, the current control link remains unchanged. In this example shown in FIG. 7, the AP 102 accepts the request of control link switch and sends the response frame carrying the acceptance. Hence, the non-AP STA 104 will switch the control link. If the new control link is currently disabled, the request frame and the response frame need to carry link enable negotiation parameters to enable the link.

In one exemplary design, at least one of the request frame and the response frame may be transmitted through a current control link. In another exemplary design, at least one of the request frame and the response frame may be transmitted through a non-control link. To put it simply, the request/response frame exchange may be achieved by using current control link(s), non-control link(s), or a combination thereof. Preferably, the request/response frame exchange may occur through the same link.

The non-AP STA 104 starts the switch process after receiving the response frame carrying that the AP 102 accepts the request of control link switch. In this example, the non-AP STA 104 sends a notice frame to AP 102 through the new control link after an optional switch delay for link setup. After receiving the notice frame, the AP 102 sends a notice acknowledgement (Notice-Ack) frame to the non-AP STA 104 through the new control link. In accordance with the proposed control link switch operation, the new control link becomes effective, and the old control link acts as one non-control link, one null link, or another control link, depending upon indication of the request frame.

In a case where the parameter "current control link role to be after switch" included in the request frame is set by "remain as another control link", the current control link is transferred to another control link after the switch process. Hence, the switch process may be treated as a control link addition process for adding a new control link between AP 102 and non-AP STA 104, resulting in multiple control links co-existing between AP 102 and non-AP STA 104.

In another case where the parameter "target control link channel ID" included in the request frame is set by "Null" and the parameter "current control link role to be after switch" included in the request frame is set by "transfer to non-control link", the current control link is transferred to a null link after the switch process. Hence, the switch process may be treated as a control link removal process for deleting an existing control link between AP 102 and non-AP STA 104. If there exists only one control link between AP 102 and non-AP STA 104, the control link removal process should be forbidden.

Figure 8:
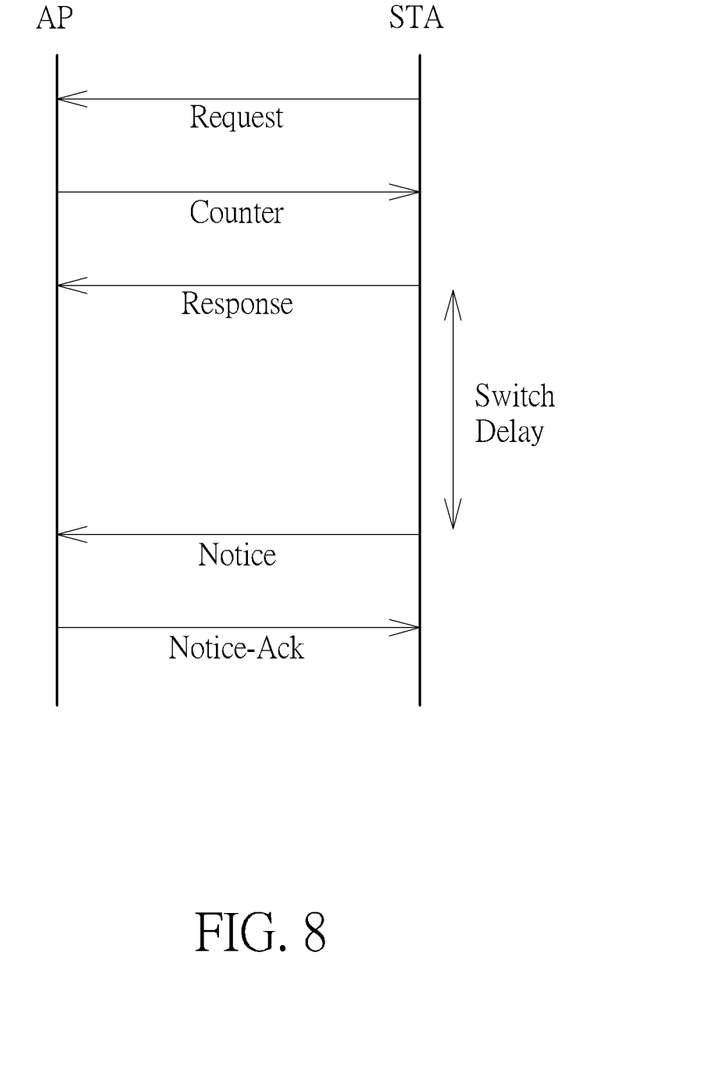
FIG. 8 is a sequence diagram of a fourth control link switch operation according to an embodiment of the present invention.

FIG. 8 is a sequence diagram of a fourth control link switch operation according to an embodiment of the present invention. In this example, a control link switch process is initiated by a request frame sent from non-AP STA 104 to AP 102, where AP 102 and non-AP STA 104 are both WI-FI MLDs. The request frame is used for requesting a switch process of switching a current control link to one new control link. The request frame may include information elements (or fields) that carry necessary information of the control link switch process. For example, the request frame may include information elements indicating a frame type "Request", a request serial ID, a current control link channel ID, and parameters including a target control link channel ID, an optional required time to finish the switch process, a current control link role after switch, etc.

For example, the new control link indicated in the request frame may be a non-control link that is currently enabled between AP 102 and non-AP STA 104. For another example, the new control link indicated in the request frame may be a non-control link that is currently disabled between AP 102 and non-AP STA 104, but is capable of being enabled after the switch process. For yet another example, the new control link indicated in the request frame may be a null link.

After receiving the request frame, the AP 102 sends a counter frame to the AP 102. The counter frame contains parameter suggestion on the AP side. Specifically, the counter frame suggests that the current control link be switched to another new control link (which is different from the new control link indicated in the request frame) by the switch process. For example, the new control link indicated in the counter frame may be a non-control link that is currently enabled between AP 102 and non-AP STA 104. For another example, the new control link indicated in the counter frame may be a non-control link that is currently disabled between AP 102 and non-AP STA 104, but is capable of being enabled after the switch process. For yet another example, the new control link indicated in the counter frame may be a null link. The counter frame may include information elements (or fields) that carry necessary information of the control link switch process. For example, the counter frame may include information elements indicating a frame type "Counter" and a parameter "target control link channel ID".

After receiving the counter frame, the non-AP STA 104 sends a response frame to the AP 102. The response frame may include information elements (or fields) that carry necessary information of the control link switch process. For example, the response frame may include information elements indicating a frame type "Response" and a frame status "Accept" or "Reject". The non-AP STA 104 may reject the AP-side suggestion of control link switch and send the response frame carrying the rejection. Hence, the current control link remains unchanged. In this example shown in FIG. 8, the non-AP STA 104 accepts the AP-side suggestion of control link switch, and sends the response frame carrying the acceptance and containing updated parameters adopted from AP's suggestion. Hence, the non-AP STA 104 will switch the control link. If the new control link is currently disabled, the request frame, the counter frame, and the response frame need to carry link enable negotiation parameters to enable the link.

In one exemplary design, at least one of the request frame, the counter frame and the response frame may be transmitted through a current control link. In another exemplary design, at least one of the request frame, the counter frame and the response frame may be transmitted through a non-control link. To put it simply, the request/counter/response frame exchange may be achieved by using current control link(s), non-control link(s), or a combination thereof. Preferably, the request/counter/response frame exchange may occur through the same link.

The non-AP STA 104 starts the switch process after sending the response frame carrying that the non-AP STA 104 accepts the AP-side suggestion of control link switch. In this example, the non-AP STA 104 sends a notice frame to AP 102 through the new control link after an optional switch delay for link setup. After receiving the notice frame, the AP 102 sends a notice acknowledgement (Notice-Ack) frame to the non-AP STA 104 through the new control link. In accordance with the proposed control link switch operation, the new control link becomes effective, and the old control link acts as one non-control link, one null link, or another control link, depending upon indication of the request frame.

In a case where the parameter "current control link role to be after switch" included in the request frame is set by "remain as another control link", the current control link is transferred to another control link after the switch process. Hence, the switch process may be treated as a control link addition process for adding a new control link between AP 102 and non-AP STA 104, resulting in multiple control links between AP 102 and non-AP STA 104.

In another case where the parameter "target control link channel ID" included in the counter frame is set by "Null" and the parameter "current control link role to be after switch" included in the request frame is set by "transfer to non-control link", the current control link is transferred to a null link after the switch process. Hence, the switch process may be treated as a control link removal process for deleting an existing control link between AP 102 and non-AP STA 104. If there exists only one control link between AP 102 and non-AP STA 104, the control link removal process should be forbidden.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control link switch method employed by a wireless fidelity (WI-FI) multi-link device (MLD) comprising:
    sending a request frame to another WI-FI MLD for requesting a switch process of switching a current control link to a new control link; and
    receiving a response frame from said another WI-FI MLD, wherein after the response frame is received, the new control link is selectively enabled at the WI-FI MLD;
    wherein the new control link indicated in the request frame is a non-control link that is currently enabled between the WI-FI MLD and said another WI-FI MLD; or
    wherein the new control link indicated in the request frame is a non-control link that is currently disabled between the WI-FI MLD and said another WI-FI MLD, but is capable of being enabled after the switch process; or
    wherein the new control link indicated in the request frame is a null link.

2. The control link switch method of claim 1, wherein at least one of the request frame and the response frame is transmitted through the current control link.

3. The control link switch method of claim 1, wherein at least one of the request frame and the response frame is transmitted through a non-control link.

4. The control link switch method of claim 1, wherein the request frame indicates that the current control link is transferred to a non-control link after the switch process.

5. The control link switch method of claim 1, wherein the request frame indicates that the current control link remains as another control link after the switch process.

6. The control link switch method of claim 1, wherein the WI-FI MLD is an access point (AP), and said another WI-FI MLD is a non-AP station (STA).

7. The control link switch method of claim 6, further comprising:
    after receiving the response frame, receiving a notice frame from said another WI-FI MLD via the new control link; and
    after receiving the notice frame, sending a notice acknowledgment frame to said another WI-FI MLD via the new control link.

8. The control link switch method of claim 1, wherein said another WI-FI MLD is an access point (AP), and the WI-FI MLD is a non-AP station (STA).

9. The control link switch method of claim 8, further comprising:
    after receiving the response frame, sending a notice frame to said another WI-FI MLD via the new control link; and
    after sending the notice frame, receiving a notice acknowledgment frame from said another WI-FI MLD via the new control link.

10. A control link switch method employed by a wireless fidelity (WI-FI) multi-link device (MLD) comprising:
    sending a request frame to another WI-FI MLD for requesting a switch process of switching a current control link to one new control link;
    receiving a counter frame from said another WI-FI MLD, wherein the counter frame suggests that the current control link be switched to another new control link by the switch process, where said another new control link is different from said one new control link; and
    sending a response frame to said another WI-FI MLD, wherein after the response frame is sent, said another new control link is selectively enabled at the WI-FI MLD;
    wherein said another new control link indicated in the counter frame is a non-control link that is currently enabled between the WI-FI MLD and said another WI-FI MLD; or
    wherein said another new control link indicated in the counter frame is a non-control link that is currently disabled between the WI-FI MLD and said another WI-FI MLD, but is capable of being enabled after the switch process; or
    wherein said another new control link indicated in the counter frame is a null link.

11. The control link switch method of claim 10, wherein at least one of the request frame, the counter frame and the response frame is transmitted through the current control link.

12. The control link switch method of claim 10, wherein at least one of the request frame, the counter frame and the response frame is transmitted through a non-control link.

13. The control link switch method of claim 10, wherein the request frame indicates that the current control link is transferred to a non-control link after the switch process.

14. The control link switch method of claim 10, wherein the request frame indicates that the current control link remains as another control link after the switch process.

15. The control link switch method of claim 10, wherein the WI-FI MLD is an access point (AP), and said another WI-FI MLD is a non-AP station (STA).

16. The control link switch method of claim 15, further comprising:
    after sending the response frame, receiving a notice frame from said another WI-FI MLD via said another new control link; and
    after receiving the notice frame, sending a notice acknowledgment frame to said another WI-FI MLD via said another new control link.

17. The control link switch method of claim 10, wherein said another WI-FI MLD is an access point (AP), and the WI-FI MLD is a non-AP station (STA).

18. The control link switch method of claim 17, further comprising:
- after sending the response frame, sending a notice frame to said another WI-FI MLD via said another new control link; and
- after sending the notice frame, receiving a notice acknowledgment frame from said another WI-FI MLD via said another new control link.

\* \* \* \* \*